United States Patent
Brown et al.

(10) Patent No.: US 10,576,718 B2
(45) Date of Patent: Mar. 3, 2020

(54) HEAT SEALABLE MULTILAYER PACKAGING FILM WITH IMPROVED OPACITY

(71) Applicant: The Procter & Gamble Company, Cincinnati, OH (US)

(72) Inventors: April Renae Brown, Cincinnati, OH (US); Norman Scott Broyles, Hamilton, OH (US); Gary Wayne Gilbertson, Liberty Township, OH (US); Christian Kohlweyer, Bad Vildel (DE); Fei Wang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 200 days.

(21) Appl. No.: 15/639,402

(22) Filed: Jun. 30, 2017

(65) Prior Publication Data
US 2018/0001605 A1    Jan. 4, 2018

(51) Int. Cl.
*B32B 27/08* (2006.01)
*B32B 27/20* (2006.01)
(Continued)

(52) U.S. Cl.
CPC .............. *B32B 27/08* (2013.01); *B32B 3/02* (2013.01); *B32B 7/02* (2013.01); *B32B 7/04* (2013.01); *B32B 7/08* (2013.01); *B32B 7/12* (2013.01); *B32B 25/04* (2013.01); *B32B 25/16* (2013.01); *B32B 27/20* (2013.01); *B32B 27/32* (2013.01);
(Continued)

(58) Field of Classification Search
CPC .......... B32B 27/08; B32B 27/20; B32B 27/32
See application file for complete search history.

(56) References Cited

U.S. PATENT DOCUMENTS

| 3,456,044 A | 7/1969 | Pahlke |
| 3,557,265 A | 1/1971 | Chisolm et al. |
| (Continued) | | |

FOREIGN PATENT DOCUMENTS

| CN | 101367284 A | 2/2009 |
| EP | 0 388 086 A2 | 9/1990 |
| (Continued) | | |

OTHER PUBLICATIONS

PCT International Search Report, dated Mar. 16, 2017 (10 pages).

*Primary Examiner* — Nicholas E Hill
(74) *Attorney, Agent, or Firm* — Daniel S. Albrecht

(57) ABSTRACT

An improved multilayer polymer film is disclosed. The film may include a first skin layer, a second skin layer, and an intermediate layer between the skin layers. The first, second and intermediate layers may be formed of respective first, second and intermediate polymer compositions. Each layer may have distributed therein particles of titanium dioxide to a weight content of from 6 percent to 14 percent. One or both the second skin layer and the intermediate layer may have distributed therein non-white pigment particles to a weight content of from 0.050 percent to 0.15 percent of such layer(s). The contents and distribution among layers of the pigments may provide for relatively disproportionate improvement of opacity while preserving a neutral white color surface to receive ink-printing, enabling high conformity of printed colors with target colors, and preserving weldability of the film to itself.

21 Claims, 3 Drawing Sheets

(51) Int. Cl.
  *B32B 27/32* (2006.01)
  *C09J 7/35* (2018.01)
  *B32B 7/08* (2019.01)
  *B32B 3/02* (2006.01)
  *B32B 7/02* (2019.01)
  *B32B 7/04* (2019.01)
  *B32B 7/12* (2006.01)
  *B32B 27/36* (2006.01)
  *B32B 25/16* (2006.01)
  *B32B 27/34* (2006.01)
  *B32B 25/04* (2006.01)

(52) U.S. Cl.
  CPC .............. *B32B 27/34* (2013.01); *B32B 27/36* (2013.01); *C09J 7/35* (2018.01); *B32B 2250/02* (2013.01); *B32B 2250/03* (2013.01); *B32B 2250/242* (2013.01); *B32B 2262/02* (2013.01); *B32B 2262/062* (2013.01); *B32B 2264/0214* (2013.01); *B32B 2264/10* (2013.01); *B32B 2264/102* (2013.01); *B32B 2264/104* (2013.01); *B32B 2264/105* (2013.01); *B32B 2264/108* (2013.01); *B32B 2264/12* (2013.01); *B32B 2270/00* (2013.01); *B32B 2272/00* (2013.01); *B32B 2307/308* (2013.01); *B32B 2307/406* (2013.01); *B32B 2307/4026* (2013.01); *B32B 2307/41* (2013.01); *B32B 2307/54* (2013.01); *B32B 2307/554* (2013.01); *B32B 2432/00* (2013.01); *B32B 2555/02* (2013.01)

(56) References Cited

U.S. PATENT DOCUMENTS

| | | |
|---|---|---|
| 3,565,985 A | 2/1971 | Schrenk et al. |
| 3,759,647 A | 9/1973 | Turner et al. |
| 3,884,606 A | 5/1975 | Schrenk |
| 3,929,678 A | 12/1975 | Laughlin et al. |
| 4,259,217 A | 3/1981 | Murphy |
| 4,352,849 A | 10/1982 | Mueller |
| 4,820,557 A | 4/1989 | Warren |
| 4,865,902 A | 9/1989 | Golike et al. |
| 4,927,708 A | 5/1990 | Herran et al. |
| 4,952,451 A | 8/1990 | Mueller |
| 4,963,419 A | 10/1990 | Lustig et al. |
| 5,094,788 A | 3/1992 | Schrenk et al. |
| 5,119,871 A * | 6/1992 | Schwaegerle ........... B32B 27/20 160/236 |
| 5,179,164 A | 1/1993 | Lausberg et al. |
| 5,261,899 A | 11/1993 | Visscher et al. |
| 6,258,308 B1 | 7/2001 | Brady et al. |
| 6,265,512 B1 | 7/2001 | Siedle et al. |
| 6,413,595 B1 | 7/2002 | Schirmer |
| 6,719,742 B1 * | 4/2004 | McCormack ..... A61F 13/51462 604/385.01 |
| 7,910,658 B2 | 3/2011 | Chang et al. |
| 7,993,739 B2 | 8/2011 | Barger et al. |
| 8,114,522 B2 * | 2/2012 | Kitora .................... B32B 27/32 428/483 |
| 8,685,514 B2 | 4/2014 | Jueruzal et al. |
| 8,821,145 B2 | 9/2014 | Roberto et al. |
| 9,169,366 B2 | 10/2015 | Weisman et al. |
| 9,492,332 B2 | 11/2016 | Cancio et al. |
| 2005/0260369 A1 | 11/2005 | Grof et al. |
| 2006/0102280 A1 * | 5/2006 | Hutt ....................... B32B 27/20 156/325 |
| 2007/0077410 A1 * | 4/2007 | Shi .......................... B32B 27/20 428/317.1 |
| 2010/0062231 A1 | 3/2010 | Abed et al. |
| 2012/0237746 A1 * | 9/2012 | O'Donnell ................ B32B 7/02 428/216 |
| 2012/0282476 A1 * | 11/2012 | Lu ........................... B32B 15/08 428/461 |
| 2015/0104627 A1 | 4/2015 | O'Donnell et al. |
| 2015/0343748 A1 * | 12/2015 | Broyles ................... A61L 15/24 428/220 |

FOREIGN PATENT DOCUMENTS

| | | | |
|---|---|---|---|
| EP | 0 414 549 B1 | 12/1994 | |
| EP | 2 826 624 A1 | 1/2015 | |
| JP | 2001-129949 A | 5/2001 | |
| JP | 4121815 B2 | 7/2008 | |
| WO | WO-0240270 A1 * | 5/2002 | ............. B32B 27/18 |

* cited by examiner

HEAT SEALABLE MULTILAYER PACKAGING FILM WITH IMPROVED OPACITY

CROSS REFERENCE TO RELATED APPLICATION

This application claims priority to PCT Application No. CN2016/088098, filed Jul. 1, 2016, the substance of which is incorporated herein by reference.

BACKGROUND

Non-fragile, compressible consumer products such as disposable diapers and training pants, feminine hygiene pads, disposable adult incontinence pads and pants, and wipes and cloths for baby and personal cleansing and household cleaning, are often packaged and sold at retail (i.e., placed on display and for sale in a retail store) in soft packages or bags formed of polymer film. Such packages are often formed from one or more sheets of polymer film, with edges joined at seams via application of heat, which has caused the film to melt and fuse along the seams.

It is often desired that packaging film be amenable to seaming via application of heat in such a manner that thorough fusing and sealing will occur, while at the same time, dramatic deformation of the film in the seaming equipment will not occur. This capability may be desired so that the seams formed are mechanically strong for package structural integrity, and the seams are substantially sealed or airtight to help protect the contents from humidity and contamination, e.g., by entry of dust into the package. In conjunction, it is desirable that the polymer film material will not melt so much as to separate from the film sheet and foul the seaming equipment, and that the film material will substantially retain its dimensions and appearance through or across the seam.

It is often desired that a film to be used to form a retail package have as much opacity as can be achieved, for purposes of imparting a robust appearance to the package, for purposes of concealment of the contents, for purposes of preventing appearance of the contents from visually interfering with outward appearance of printed material on the package and/or for purposes of reducing a need for opacity of (and associated expense for) inks that may be used for printing colored package artwork, graphic designs and/or characters and text constituting branding, labeling and product information. It is also often desired that a package film material have a bright white color, for purposes of imparting a new, fresh and clean appearance to the package and/or for purposes of providing a bright neutral background for colored printing.

Finally, for purposes of providing a structurally robust package while also exercising economy in consumption of polymer materials, it is usually desired that a packaging film have as much mechanical (tensile) strength, seamability, opacity, and whiteness, as possible, while having the lowest caliper (thickness) as possible and practical.

Maximizing all of these desirable features and properties of a packaging film requires use of materials and methods in ways that are not mutually complementary and cost effective. Inclusion of inorganic opacifying and/or whitening agents will typically compromise a polymer film's tensile strength, yield stress and ability to fuse cleanly and neatly with application of heat, to form seams with structural integrity and good sealing. Commonly used inorganic opacifying and whitening agents, such as preparations containing particles of titanium dioxide ($TiO_2$) and/or calcium carbonate ($CaCO_3$), are both abrasive to film extruding equipment, and add substantial cost. As caliper and basis weight of a film material is decreased, seamability may be compromised, and tensile strength and opacity are decreased.

In view of these competing objectives, there is room for improvement in formulation of materials and manufacture of packaging films that are required to be easily seamable via application of heat, be highly opaque, and have a bright white color. Prior attempts to impart opacity and/or whiteness, such as, for example, those described in U.S. Pat. Nos. 5,091,236; 5,261,899; 5,800,913 and European Patents Specification Nos. EP 0 388 086 and EP 0 473 573, have had only limited success.

DESCRIPTION OF EXAMPLES

Definitions

"Film" means a sheet structure having a length, width and thickness (caliper), wherein each of the length and width greatly exceed the thickness, i.e., by a factor of 1,000 or more, the structure having one layer (monolayer) or more respectively adjacent layers (multilayer), each layer being a continuous structure formed of one or more thermoplastic polymer resins (including blends thereof).

"High Density Polyethylene" (HDPE) means a type of polyethylene defined by a density equal to or greater than 0.941 $g/cm^3$.

"Low Density Polyethylene" (LDPE) means a type of polyethylene defined by a density equal to or less than 0.925 $g/cm^3$.

"Medium Density Polyethylene" (MDPE) means a type of polyethylene defined by a density range of 0.926-0.940 $g/cm^3$.

"Linear Low Density Polyethylene" (LLDPE) means a type of Low Density Polyethylene characterized by substantially linear polyethylene, with significant numbers of short branches, commonly made by copolymerization of ethylene with longer-chain olefins. Linear low-density polyethylene differs structurally from conventional low-density polyethylene (LDPE) because of the absence of long chain branching. The linearity of LLDPE results from the different manufacturing processes of LLDPE and LDPE. In general, LLDPE is produced at lower temperatures and pressures by copolymerization of ethylene and such higher alpha-olefins as butene, hexene, or octene. The copolymerization process produces a LLDPE polymer that has a narrower molecular weight distribution than conventional LDPE and in combination with the linear structure, significantly different rheological properties.

With respect to quantifying the weight fraction or weight percentage of a component of a polymer resin composition forming a film or layer thereof, "predominately" (or a form thereof) means that the component constitutes the largest weight fraction or weight percentage among all components of the composition.

Package; Packaging Film

Figure 1A:
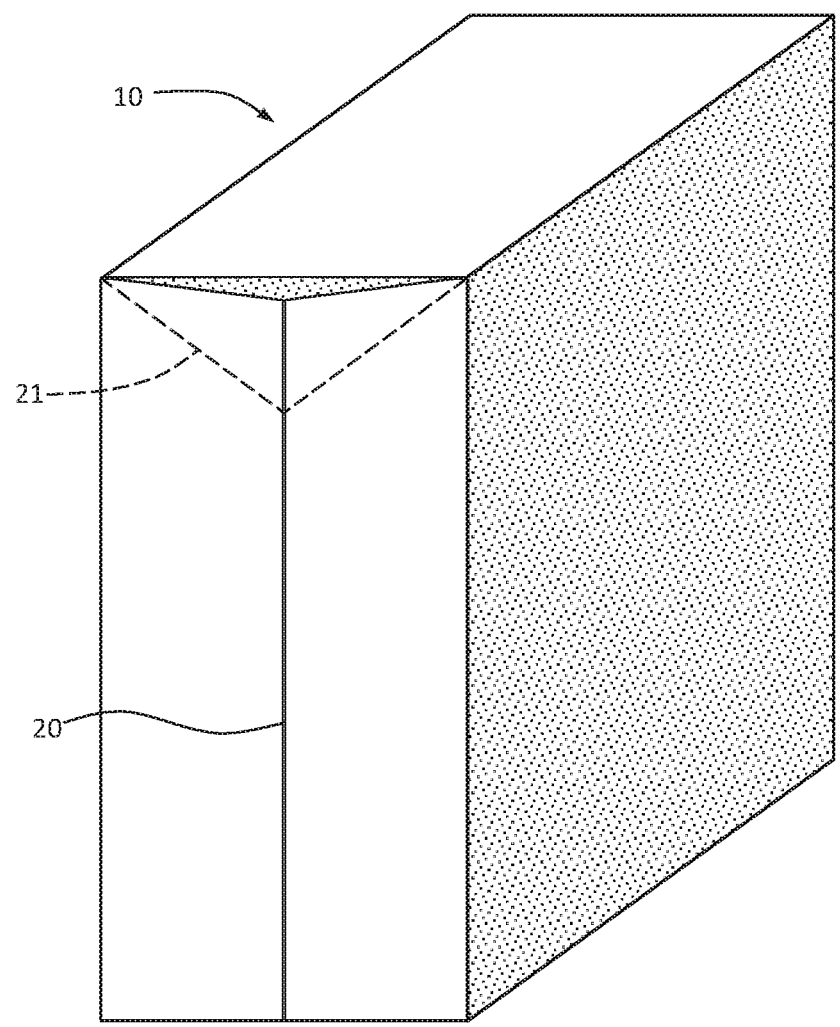
FIG. 1A is a schematic perspective view of a package formed of film, showing one end, a larger face, and a side with a side seam.
Figure 1B:
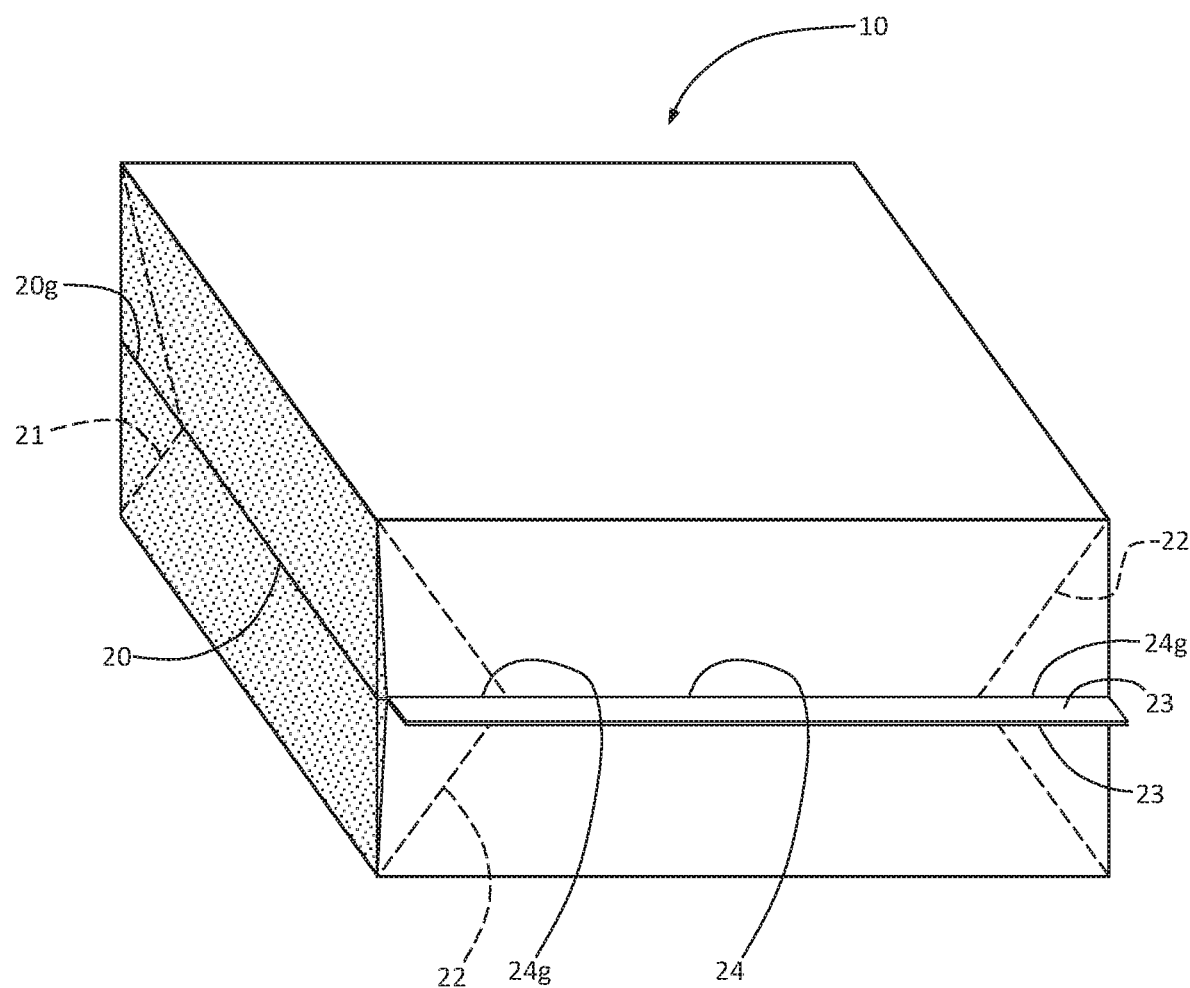
FIG. 1B is a schematic perspective view of the package of FIG. 1A, showing the opposing second end with an end seam, a face, and the side with the side seam.

Referring to FIGS. 1A and 1B, a retail package 10 of non-fragile, compressible products (such as, for example disposable diapers, training pants, feminine hygiene pads, adult incontinence pants, wet wipes, household cleaning cloths, dusting cloths or pads, etc.) may be formed of a polymer film. The film may be a single layer (monolayer), or may have two, three or more layers (multilayer). A multilayer film may have, for example, an outer skin layer formed of a first polymer and an inner skin layer formed of a second polymer. (As used herein, the terms "outer" and "inner" refer to the positioning of the layer relative the inside and the outside of the finished package; thus, the "inner layer" faces the contained product, and the "outer layer" faces outward and has an outer surface that is exposed to view and touch by, e.g., shoppers in a retail store.)

In the example shown, a rectangular package 10 may be formed from a single sheet of film stock that is suitably folded to form side gussets 21 and then joined by bonding to form two side seams 20 on opposite sides, to form a bag structure that is open at one end. Thereafter, the bag structure may be filled with product through the open end, and the open end may then be closed by suitably folding to form end gussets 22, bringing the edges 23 together, and bonding them together to form end seam 24. In some examples, the film stock may be supplied pre-printed with desired commercial artwork, graphics, trademark(s) and/or product information, prior to formation of the bag structure.

The bonds forming any or all of the seams such as seams 20, 24 may be created by welding. (Herein, "weld" refers to a union between separate portions of film stock, effected by thermal fusing and bonding, of the respective portions, which cannot be separated without substantial destruction to the remainder of one or both joined portions.) If bag-forming and/or packaging machinery forms welds in the film that join the film stock to itself by applying heat that causes the film to fuse to itself, it may be desirable that the film stock be multilayer film, and that the layer(s) to be brought into contact and fused be formed of polymer(s) that have lower melting temperature(s) than those of the polymer(s) used to form the other layer(s). This enables heat energy to be applied to a degree sufficient to heat the layer(s) in contact and cause them to fuse, but not sufficient to cause undesired melting and deformation of the other layer(s), which could cause the package to be misshapen and/or displace and/or distort printing on the film stock.

A multilayer film may be co-formed (such as by coextrusion), or in another example, individual layers may be separately formed and then laminated together following their formation, by use of a suitable laminating adhesive. In this latter example, an advantage provided is that one of the layers may be printed on one side before lamination. Following that, the printed side may be faced inward (facing the other layer(s)) during lamination, such that it is protected by the other layer(s) from abrasion and wear in the finished film product, thereby preserving the integrity of the printed images, graphics, verbal content, etc. A suitable multilayer film may be formed of one or more polyolefins, such as polypropylene and polyethylene. In one example, the stock film may have at least two layers, including a first layer of predominately polyethylene and second layer of predominately polypropylene. In one example, a layer formed of predominately polypropylene having a first relatively higher melting temperature, and a layer of predominately polyethylene having a second relatively lower melting temperature, may be used to form the outer and inner layers, respectively. In another example, an inner layer may be formed predominately of a first type of polyethylene having a relatively lower melting temperature, and an outer layer may be formed predominately of a second type of polyethylene having a relatively higher melting temperature.

In an application such as described herein, a multilayer film may be preferred. A multilayer film may have layers of polymer compositions particularly chosen for the characteristics they impart to the film. For example, one or two outer skin layers may be formed of compositions chosen for, e.g., surface gloss; printability; smooth feel; pliability; low noise generation (upon being handled and manipulated, as by a consumer); relatively lower melt temperature and fusibility/weldability; or any combination of these characteristics. One or more intermediate layers may be formed of compositions chosen for, e.g., tensile strength; stiffness; toughness; suitability for inclusion of blended-in recycled material; environmentally-friendly and/or sustainable material sourceability; relatively higher melt temperature; co-extrusion compatibility with adjacent layers (such that strong bonding between layers occurs upon co-extrusion); or any combination of these characteristics. For film stock in which only one side of the film will be placed in contact with itself and welded, a two-layer film may suffice. For film stock in which both sides of the film will be placed in contact with itself and welded, a film having at least three layers, with two outer skin layers that are weldable, may desired. It will be appreciated that a package having the configuration depicted in FIGS. 1A and 1B requires the film to be welded to itself on both sides—on the outer side on the shorter portions of the seams 20g and 24g securing the gussets 21, 22, and on the inner side at all other portions of the seams 20, 24.

Film Composition

Figure 2:
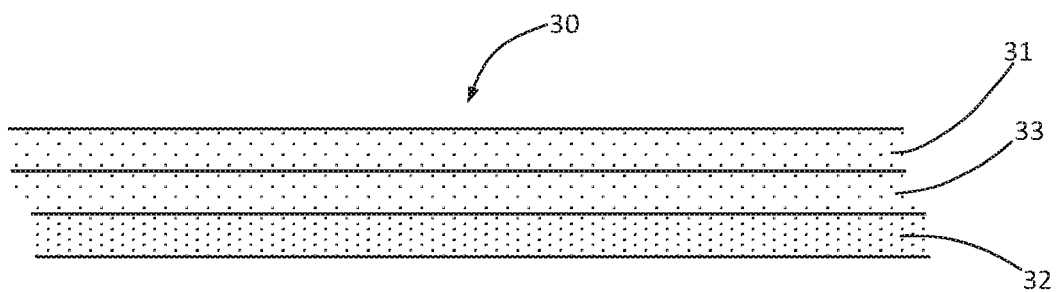
FIG. 2 is a schematic cross section of a portion of a three-layer film, taken along a plane orthogonal to the outer surface of the film.

Referring to FIG. 2, a multilayer film may include first skin layer 31, second skin layer 32, and intermediate layer 33.

Each of layers 31, 32 and 33 may include a base polymer. Base polymers may include polyolefins, particularly polyethylenes, polypropylenes, polybutadienes, polypropylene-ethylene interpolymer and copolymers having at least one olefinic constituent, and any mixtures thereof. Certain polyolefins can include linear low density polyethylene (LLDPE), low density polyethylene (LDPE), medium density polyethylene (MDPE), high density polyethylene (HDPE), isotactic polypropylene, random polypropylene copolymers, impact modified polypropylene copolymer, and other polyolefins which are described in PCT Application Nos. WO 99/20664, WO 2006/047374, and WO 2008/086539. Other base polymers such as polyesters, nylons, polyhydroxyalkanoates (or PHAs), copolymers thereof, and combinations of any of the foregoing may also be suitable. In addition, polyolefin plastomers and elastomers could be used to form the multi-layer polymeric films. Examples of such suitable polyolefin plastomers and elastomers are described in U.S. Pat. No. 6,258,308; U.S. Publication No. 2010/0159167 A1; and PCT Application Nos. WO 2006/047374 and WO 2006/017518. In one embodiment, such polyolefin plastomers and/or elastomers may comprise up to 25% by volume of the multi-layer polymeric film. Other useful polymers include poly-α-olefins such as those described in PCT Application No. WO 99/20664 and the references described therein.

In some examples, one or both of the skin layers such as layers 31, 32 may be formed of predominately MDPE, LDPE or LLDPE, more preferably LLDPE. A skin layer formed of predominately LLDPE may be particularly preferred because it imparts the skin layer with a good combination of weldability, relatively low melt temperature, printability (compatibility with currently commercially available printing inks), smooth surface finish, low noise, and a soft and pliable feel. In some examples, an intermediate layer such as layer 33 may be formed of predominately HPDE, MDPE or LDPE, more preferably MDPE.

An intermediate layer formed of predominately MDPE may be particularly preferred with one or more skin layers formed predominately of LLDPE because it imparts the intermediate layer with a good combination of relatively higher melt temperature, co-extrusion compatibility with the skin layer(s), pliability, toughness and tensile strength.

In alternative examples, an intermediate layer may be formed partially or predominately of a thermoplastic polymer other than polyethylene, such as any of the polymers identified above, or any polymers identified as suitable for intermediate layers in, for example, U.S. Pat. Nos. 9,169,366 and 5,261,899; and U.S. Pat. Apps. Pub. Nos. 2015/03433748; 2015/0104627; and 2012/0237746, including bio-polymers or polymers having bio-based content as described in the latter three publications, such as, but not limited to, polylactic acid and thermoplastic starch. Additionally, an intermediate layer may include recycled thermoplastic polymer of any of the above-described types.

For purposes of balancing economy of polymer usage and maximization of opacity according to the description below, it may be desired that the total caliper of the film fall within a range of from 40 μm to 100 μm, more preferably from 50 μm to 90 μm, and even more preferably from 60 μm to 80 μm. For purposes of balancing economy of polymer usage, tensile strength and weldability, it may be desired that a three-layer film as described herein have a first and second skin layers each constituting from 15 percent to 35 percent of the weight of the film, and an intermediate layer constituting from 30 percent to 70 percent of the weight of the film.

Tie Layers

Figure 3:
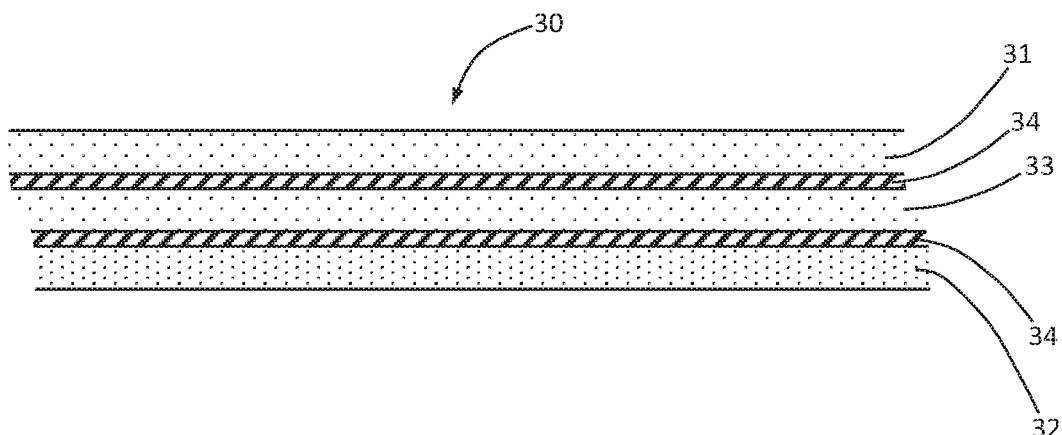
FIG. 3 is a schematic cross section of a portion of a five-layer film, taken along a plane orthogonal to the outer surface of the film.

Referring to FIG. 3, a multi-layer film as contemplated herein may comprise one or more tie layers 34. A tie layer may be necessary when the polymers of adjoining layers would not otherwise be miscible or compatible so as to bond to each other during extrusion. For example, a tie layer between a polyethylene skin layer and an intermediate layer having a large polylactic acid content may be deemed desirable. Thus, tie layers may be disposed between an intermediate layer and each of the skin layers. A tie layer may include one or more functionalized polyolefins. In some example, a tie layer may include from 5%, 10%, 20%, 30%, 40% or 45% to 55%, 60%, 70%, 80%, 90%, or 100%, by weight of the tie layer, of the one or more functionalized polyolefins. A tie layer may consist essentially of the one or more functionalized polyolefins.

For example, because of the significant difference in polarity between polylactic acid (PLA) and polyolefins, blends of these components typically result in incompatible systems with poor physical properties. A multilayer film having predominately polyethylene skin layers sandwiching an intermediate layer including PLA may also include one or more tie layers between the skin layers and the intermediate layer. This particular multi-layer structure may provide the MD and/or CD tensile properties useful for products currently made from polyethylene while incorporating a renewable feedstock (PLA). This arrangement may also enable downgauging (i.e., caliper reduction or basis weight reduction) of the film resulting from improvements in stiffness that can be used to drive sustainability and/or used as a cost savings.

The tie layer may comprise a functionalized polyolefin that possesses a polar component provided by one or more functional groups that is compatible with the PLA of the intermediate layer(s) and a non-polar component provided by an olefin that is compatible with one or more polyolfefins of the adjacent skin layer. The polar component may, for example, be provided by one or more functional groups and the non-polar component may be provided by an olefin. The olefin component may generally be formed from any linear or branched α-olefin monomer, oligomer, or polymer (including copolymers) derived from an olefin monomer. The α-olefin monomer typically has from 2 to 14 carbon atoms and preferably from 2 to 6 carbon atoms. Examples of suitable monomers include, but not limited to, ethylene, propylene, butene, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers.

An olefin copolymer can include a minor amount of non-olefinic monomers, such as styrene, vinyl acetate, diene, or acrylic and non-acrylic monomer. Functional groups may be incorporated into the polymer backbone using a variety of known techniques. For example, a monomer containing the functional group may be grafted onto a polyolefin backbone to form a graft copolymer. Such grafting techniques are well known in the art and described, for instance, in U.S. Pat. No. 5,179,164. In other embodiments, the monomer containing the functional groups may be copolymerized with an olefin monomer to form a block or random copolymer. Regardless of the manner in which it is incorporated, the functional group of the compatibilizer may be any group that provides a polar segment to the molecule, such as a carboxyl group, acid anhydride group, acid amide group, imide group, carboxylate group, epoxy group, amino group, isocyanate group, group having oxazoline ring, hydroxyl group, and so forth. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond and Eastman Chemical Company under the designation Eastman G series, and AMPLIFY™ GR Functional Polymers (maleic anhydride grafted polyolefins). Other examples include Lotader AX8900 (polyethylene-methyl acrylate-glycidyl methacrylate terpolymer) and Lotader TX 8030 (polyethylene-acrylic ester-maleic anhydride terpolymer) available from Arkema.

In some aspects, the tie layer can be a resin composition as disclosed in U.S. Pat. No. 8,114,522. This resin composition includes a modified PO resin and a terpene resin. Alternatively, it includes a polylactic acid resin, a modified polyolefin resin, and a hydrogenated petroleum resin. These compositions are suitable for use as a tie layer between the outer layer and the core layer.

In some examples, an outer layer and tie layer may be essentially combined as an outer layer by incorporating a functionalized polyolefin into one or both of the outer layers. In these instances, the multi-layer film may comprise 3 or 4 layers. In the case of a 3 layer film, the film may comprise a first outer layer comprising a polyolefin and/or a functionalized polyolefin, one or more core layers, and a second outer layer comprising a polyolefin and/or a functionalized polyolefin). In the case of a 4 layer film, the film may comprise a first outer layer comprising a polyolefin and/or a functionalized polyolefin, one or more core layers, a tie layer, and a second outer layer comprising a polyolefin.

Additives

Any of the layers of the multi-layer film may comprise small amounts of one or more additives. Typically, the additives may comprise less than about 10%, 5%, 4%, 3%, 2%, 1%, 0.5%, 0.1% or 0.01% by weight of the layer of the additive. Some non-limiting examples of classes of additives contemplated include perfumes, dyes, pigments, nanoparticles, antistatic agents, fillers, and combinations thereof. The layers disclosed herein can contain a single additive or a mixture of additives. For example, both a perfume and a colorant (e.g., pigment and/or dye) can be present.

A pigment or dye can be inorganic, organic, or a combination thereof. Specific examples of pigments and dyes contemplated include pigment Yellow (C.I. 14), pigment Red (C.I. 48:3), pigment Blue (C.I. 15:4), pigment Black (C.I. 7), and combinations thereof. Specific contemplated dyes include water soluble ink colorants like direct dyes, acid dyes, base dyes, and various solvent soluble dyes. Examples include, but are not limited to, FD&C Blue 1 (C.I. 42090:2), D&C Red 6 (C.I. 15850), D&C Red 7 (C.I. 15850: 1), D&C Red 9 (C.I. 15585: 1), D&C Red 21 (C.I. 45380:2), D&C Red 22 (C.I. 45380:3), D&C Red 27 (C.I. 45410: 1), D&C Red 28 (C.I. 45410:2), D&C Red 30 (C.I. 73360), D&C Red 33 (C.I. 17200), D&C Red 34 (C.I. 15880: 1), and FD&C Yellow 5 (C.I. 19140: 1), FD&C Yellow 6 (C.I. 15985: 1), FD&C Yellow 10 (C.I. 47005: 1), D&C Orange 5 (C.I. 45370:2), and combinations thereof.

Contemplated fillers include, but are not limited to, inorganic fillers such as, for example, the oxides of magnesium, aluminum, silicon, and titanium. These materials can be added as inexpensive fillers or processing aides. Other inorganic materials that can function as fillers include hydrous magnesium silicate, titanium dioxide, calcium carbonate, clay, chalk, boron nitride, limestone, diatomaceous earth, mica glass quartz, and ceramics. Additionally, inorganic salts, including alkali metal salts, alkaline earth metal salts, phosphate salts, can be used. Additionally, alkyd resins can also be added to the composition. Alkyd resins can comprise a polyol, a polyacid or anhydride, and/or a fatty acid.

Additional contemplated additives include nucleating and clarifying agents for the thermoplastic polymer. Specific examples, suitable for polypropylene, for example, are benzoic acid and derivatives (e.g., sodium benzoate and lithium benzoate), as well as kaolin, talc and zinc glycerolate. Dibenzlidene sorbitol (DBS) is an example of a clarifying agent that can be used. Other nucleating agents that can be used are organocarboxylic acid salts, sodium phosphate and metal salts (e.g., aluminum dibenzoate). In one aspect, the nucleating or clarifying agents can be added in the range from 20 parts per million (20 ppm) to 20,000 ppm, or from 200 ppm to 2000 ppm, or from 1000 ppm to 1500 ppm. The addition of the nucleating agent can be used to improve the tensile and impact properties of the finished composition.

Contemplated surfactants include anionic surfactants, amphoteric surfactants, or a combination of anionic and amphoteric surfactants, and combinations thereof, such as surfactants disclosed, for example, in U.S. Pat. Nos. 3,929,678 and 4,259,217, and in EP 414 549, WO93/08876, and WO93/08874.

Contemplated nanoparticles include metals, metal oxides, allotropes of carbon, clays, organically modified clays, sulfates, nitrides, hydroxides, oxy/hydroxides, particulate water-insoluble polymers, silicates, phosphates and carbonates. Examples include silicon dioxide, carbon black, graphite, grapheme, fullerenes, expanded graphite, carbon nanotubes, talc, calcium carbonate, bentonite, montmorillonite, kaolin, zinc glycerolate, silica, aluminosilicates, boron nitride, aluminum nitride, barium sulfate, calcium sulfate, antimony oxide, feldspar, mica, nickel, copper, iron, cobalt, steel, gold, silver, platinum, aluminum, wollastonite, aluminum oxide, zirconium oxide, titanium dioxide, cerium oxide, zinc oxide, magnesium oxide, tin oxide, iron oxides ($Fe_2O_3$, $Fe_3O_4$) and mixtures thereof. Nanoparticles can increase strength, thermal stability, and/or abrasion resistance of the compositions disclosed herein, and can give the compositions electric properties.

Contemplated anti-static agents include fabric softeners that are known to provide antistatic benefits. These can include those fabric softeners having a fatty acyl group that has an iodine value of greater than 20, such as N,N-di (tallowoyl-oxy-ethyl)-N,N-dimethyl ammonium methylsulfate.

In particular aspects, the filler can comprise renewable fillers. These can include, but are not limited to, lipids (e.g., hydrogenated soybean oil, hydrogenated castor oil), cellulosics (e.g., cotton, wood, hemp, paperboard), lignin, bamboo, straw, grass, kenaf, cellulosic fiber, chitin, chitosan, flax, keratin, algae fillers, natural rubber, nanocrystalline starch, nanocrystalline cellulose, collagen, whey, gluten, and combinations thereof.

Synergistic Combination of Pigments, Concentrations in Layers

As noted above, a high level of whiteness and opacity may be desirable for a film stock to be used to form a retail package enclosing products. Without intending to be bound by theory, it is believed that a combination of the inclusion of a weight quantity of titanium dioxide ($TiO_2$) particles in the thermoplastic resin compositions used to form a film having at least three layers, together with inclusion of a relatively smaller weight quantity of non-white pigment particles in fewer than all layers, works synergistically to enhance opacity, in a manner that appears to be surprisingly efficient in the quantity of pigmenting materials required.

Particles of inorganic materials such as calcium carbonate, zinc oxide and titanium dioxide ($TiO_2$) may be used for both whitening and opacifying effects, when blended into resin(s) used to form films or layers thereof. Titanium dioxide may be particularly preferred because of its brightness and relatively high refractive index as compared with alternative white pigment materials.

As noted above, however, titanium dioxide is a hard, abrasive material that can cause wear on extruding equipment. Further, the presence of inorganic pigmenting agents in a film layer may compromise its ability to readily fuse and form a strong, welded and sealed bond. For these and also for reasons of economy, it may be desirable to find ways in which to maximize whitening and opacifying effects using as little titanium dioxide as possible.

It has been discovered, surprisingly, that using a relatively small amount of a non-white (colored) pigmenting agent may work synergistically with titanium dioxide to increase opacity of a multilayer film to an extent that is disproportionate to the amounts of each added. Without intending to be bound by theory, it is believed that, while particles of $TiO_2$ dispersed in a film tend to reflect the majority of incident visible light striking them, this reflection occurs at random angles, some of which are sufficient to actually reflect the light through to the other side of the film (reducing opacity). Some incident light may also entirely miss the $TiO_2$ particles without being reflected, and make its way through the film (also reducing opacity). It is believed, however, that non-white pigment particles will absorb the visible light (of colors/wavelengths other than the pigment color) reflected from $TiO_2$ particles that strikes them, as well as incident visible light that strikes them, such that the non-white pigment particles absorb more visible light than they would in the absence of $TiO_2$ particles. Visible light that is absorbed does not pass through to the side opposite the side that incident light strikes. Thus, it is believed that the combination of visible light reflection by the $TiO_2$ particles and visible light absorption by the non-white pigment particles work synergistically to increase opacity of the film.

While other non-white pigments may be used, it is believed that non-white pigments in the blue-to-violet color range are preferable for both absorbing a relatively high quantity of visible light while maintaining or even slightly enhancing opacity. Without intending to be bound by theory, it is believed that non-white pigments in the blue-to-violet color range, being reflective of blue-to-violet visible light, may function synergistically with $TiO_2$ to increase opacity because $TiO_2$ tends to absorb rather than reflect visible light of shorter wavelengths, i.e., violet light, that may be reflected from blue-to-violet pigment particles.

When a bright white, neutral printing surface is desired, adding non-white pigment to a film may be counterproductive because it may visibly impart the outer/printing surface of the film with the non-white pigment color. This imparted color may visually blend with colors of non-opaque printing inks, causing them to visually shift in color away from the target, or intended, printing colors. For example, the addition of blue pigment to a film may cause printing in yellow ink, formulated to match a target yellow shade, to visually shift toward green, and away from the target yellow shade. Accordingly, when adding non-white pigment particles to a film for purposes of enhancing opacity, it may be desired that the dispersion of non-white pigment particles be located in a layer other than, and beneath, the outer skin (printing) layer, while $TiO_2$ particles are dispersed in at least the outer skin (printing layer), and may be dispersed in the underlying layers. Accordingly, referring to FIGS. 2 and 3, for example, and assuming that first skin layer 31 is the outer layer, it may be preferred that non-white pigment particles be added and dispersed only in one or both of the second skin layer and/or in one or more intermediate layer(s) 33 present, but not to any substantial quantity in first skin layer 31. For purposes of whitening, however, it may be desired that $TiO_2$ particles be distributed in first skin layer 31 as well as in any other layers present, or all layers present, or at least in the outermost skin layer 31 and the layer(s) in which non-white particles are dispersed. This configuration may help preserve color neutrality of the printing surface of the film despite the addition of non-white pigment, and thereby improve conformity of inks printed thereon with the target/intended color palette desired for the printed material, for which the inks were formulated. This enables consistency of color usage for the manufacturer and may reduce or eliminate any need for adjusting ink formulations for the particular film substrate. Combinations described herein have enabled enhanced and high conformity of printed ink colors with target colors.

Titanium dioxide may be dispersed in the outer skin layer and in any one or all of the remaining layers, for example, the layer(s) in which non-white pigment is to be dispersed, to a level of from 6 percent to 14 percent, more preferably from 8 percent to 12 percent, and even more preferably from 9 percent to 11 percent of the weight of the respective layer.

For beneficial effect believed to be synergistic with $TiO_2$ as noted, non-white pigment may be dispersed in one or both of the inner skin layer and intermediate layer(s), to a level of at least 0.050 percent, 0.060 percent, 0.070 percent, or even more preferably 0.080 percent, of the weight of such layers. Further, however, although non-white pigment particles appear to function synergistically with $TiO_2$ to disproportionately enhance opacity, it is believed that inorganic pigment particles also have a negative impact on a film layer's ability to reliably fuse or weld to itself to form a strong, sealing bond. Additionally, as noted, even if not present in any substantial quantity in an outer skin layer, excessive non-white pigment in underlying layers may impart visible color to the film as seen from the outside, which may be undesirable for printing. Thus in some examples, it may be desired to limit the weight fraction of such non-white pigment particles in one or both of inner skin and intermediate layers to a maximum of 0.15 percent, more preferably 0.14 percent, even more preferably 0.13 percent and still more preferably 0.12 percent of the weight of each layer to which it is added.

It may be preferred that the outer skin layer have no more than an insubstantial quantity of non-white pigment dispersed therein, or at least no more than 0.050 percent of the weight thereof, more preferably no more than 0.030 percent of the weight thereof, and even more preferably no effective amount. Depending upon the thickness of the outer skin layer, it may also be preferred that the intermediate layer directly beneath the outer skin layer have no more than an insubstantial quantity of non-white pigment dispersed therein, or at least no more than 0.050 percent of the weight thereof, more preferably no more than 0.030 percent of the weight thereof, and even more preferably no effective amount, for purposes of reducing a visible coloration effect of the non-white pigment, visible on the outer surface of the product.

The compositions, caliper and opacity of several particular examples are set forth in the following Table. Example 1 is not deemed to be within the invention described herein, but is included for purposes of illustrating the synergy between non-white pigment and $TiO_2$ in enhancing opacity. It can be seen from a comparison of Example 1 and Example 2 that the addition of a relatively small amount (0.10 percent by weight) of non-white pigment dispersed in the inner skin layer appears to cause a slight increase in opacity of the film, even when the quantity of $TiO_2$ is disproportionately decreased, from 9.80 percent to 7.25 percent, by weight of the layer. It can be seen from a comparison of Example 1 and Example 3 that the addition of a relatively small amount (0.10 percent by weight) of non-white pigment dispersed in the inner skin layer appears to cause substantial and seemingly disproportionate increase in opacity of the film, when the quantity of $TiO_2$ is held constant. The non-white pigment used in the Examples was contained in a product designated AL-127848, a blue masterbatch pigmenting product available from Ampacet Corporation, Tarrytown, N.Y.

| Example | Layer/Weight Fraction % Avg Caliper μm | Opacity % | Outer Skin Layer/30% LLDPE % | LDPE % | MDPE % | TiO2 % | Additives, Other % | Non-White Pigment % | Intermediate Layer/40% LDPE % | MDPE % | TiO2 % | Additives, Other % | Non-White Pigment % | Inner Skin Layer/30% LLDPE % | LDPE % | MDPE % | TiO2 % | Additives, Other % | Non-White Pigment % |
|---|---|---|---|---|---|---|---|---|---|---|---|---|---|---|---|---|---|---|---|
| 1 | 71.6 | 88.4 | 43.50 | 15.00 | 25.00 | 9.80 | 6.70 | 0.00 | 33.00 | 50.00 | 9.80 | 7.20 | 0.00 | 41.00 | 15.00 | 25.00 | 9.80 | 9.20 | 0.00 |
| 2 | 71.7 | 88.98 | 43.50 | 15.00 | 25.00 | 9.80 | 6.70 | 0.00 | 33.00 | 50.00 | 9.80 | 7.20 | 0.00 | 47.40 | 15.00 | 25.00 | 5.25 | 7.25 | 0.10 |
| 3 | 71.5 | 91.73 | 43.50 | 15.00 | 25.00 | 9.80 | 6.70 | 0.00 | 33.00 | 50.00 | 9.80 | 7.20 | 0.00 | 40.90 | 15.00 | 25.00 | 9.80 | 9.20 | 0.10 |

Manufacturing Processes

Multilayer polymeric films may be prepared by any suitable method. For cast films one method can include employing a high output, high speed cast extrusion line using multiple extruders. The processing conditions will depend upon the materials being used, the processing equipment and the desired film properties. The multilayer films such as those described herein can also be formed from conventional simple blown film or cast extrusion techniques as well as by using more elaborate techniques such a "tenter framing" process. The present disclosure further relates to a method for making the layered arrangement for a multilayer polymeric film. Multilayer polymeric films can be made by known coextrusion processes typically using a flat cast or planar sheet or annular blown film process. Coextruded cast film or sheet structures typically have 3 to 5 layers; however, cast film or sheet structures including hundreds of layers are known. In one method for making a multilayer film, the number of layers may be multiplied by the use of a device as described in U.S. Pat. No. 3,759,647. Other methods are further described in U.S. Pat. Nos. 5,094,788 and 6,413,595. Here, a first stream comprising discrete, overlapping layers of the one or more materials is divided into a plurality of branch streams, these branch streams are redirected or repositioned and individually symmetrically expanded and contracted, the resistance to flow through the apparatus and thus the flow rates of each of the branch streams are independently adjusted, and the branch streams recombined in overlapping relationship to form a second stream having a greater number of discrete, overlapping layers of the one or more materials distributed in the prescribed gradient or other distribution. In certain embodiments, thin layers can be formed on spiral channel plates and these layers can flow into the central annular channel where micro-layer after micro-layer can then be stacked inside traditional thick layers. Such examples are described in U.S. Patent Publication No. US 2010/0072655 A1. A plurality of layers may be made in blown films by various methods. In US 2010/0072655A1, two or more incoming streams are split and introduced in annular fashion into a channel with alternating plurality of microlayers that are surrounded by standard layer polymeric streams to form blown films containing microlayer regions. For annular dies, a known microlayer process for creating a plurality of alternating layers is made by distributing the flow of the first polymer stream into every odd internal microlayer layer and distributing the flow of the second polymer stream into every even microlayer. This microlayer group is then introduced between channels of polymer streams of standard thickness. Layer multiplication technology for cast films is marketed by companies such as Extrusion Dies Industries, Inc. of Chippewa Falls, Wis. and Cloeren Inc. of Orange, Tex. Microlayer and nanolayer technology for blown films is marketed by BBS Corporation of Simpsonville, S.C.

For example, early multilayer processes and structures are shown in U.S. Pat. Nos. 3,565,985; 3,557,265; and 3,884,606. PCT Publication WO 2008/008875 discloses a method of forming alternative types of multilayered structures having many, for example fifty to several hundred, alternating layers of foam and film.

Other manufacturing options include simple blown film (bubble) processes, as described, for example, in The Encyclopedia of Chemical Technology, Kirk-Othmer, Third Edition, John Wiley & Sons, New York, 1981, Vol. 16, pp. 416-417 and Vol. 18, pp. 191-192. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.); U.S. Pat. No. 4,352,849 (Mueller); U.S. Pat. No. 4,820,557 (Warren); U.S. Pat. No. 4,927,708 (Herran et al.); U.S. Pat. No. 4,963,419 (Lustig et al.); and U.S. Pat. No. 4,952,451 (Mueller). The film structures can also be made as described in a tenter-frame technique, such as that used for oriented polypropylene.

Other multilayer polymeric film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 1-80 (published by TAPPI Press (1992)).

The multilayer polymeric films can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229. If a monolayer film layer is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), then the film must go through an additional post-extrusion step of adhesive or extrusion lamination to other packaging material layers to form a multilayer film. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. The multilayer polymeric films contemplated herein can also go through other post extrusion techniques, such as a biaxial orientation process.

A co-extrusion process for producing multi-layer film enables formation of a film with a plurality of layers that are strongly bonded together without the need for subsequent laminating operations, and use of adhesives, to join the separate layers, and thereby provides for efficiency. An additional particular advantage of a blown co-extrusion process is that the biaxial stretching that occurs in the inflated "bubble" of hot film above the die following extrusion tends to reduce directionality of tensile strength in the film after it cools. In other words, the finished film tends to be less anisotropic in tensile strength, i.e., tends to have machine direction and cross direction tensile strengths that are closer to each other, than a finished film produced in a cast extrusion process. For packaging films that will experience stress in multiple directions such as the films contemplated herein, a blown coextruded film may be preferred. A blown coextruded film may exhibit a machine direction tensile strength to yield and/or tensile strength to failure, and a cross direction tensile strength to yield and/or tensile strength to failure, wherein one is at least 75 percent of the other.

In some examples in which a surface of a skin layer, such as an outer skin layer, is to receive printing, it may be desired to treat the surface using a corona treatment process to increase its surface energy and thereby improve its wettability by printing ink, following formation of the multilayered film. For maximum effect on extruded films it may be preferred to subject to the film to corona treatment shortly following extrusion, preferably immediately following extrusion and/or at least prior to gathering of the film stock on a winder roll.

It is believed that combinations of film composition, layering and usage of pigments described herein provide for a disproportionate and surprising level of enhancement of film opacity relative the quantities of pigments and film calipers disclosed, provide a highly neutral white color, and at the same time substantially preserve or maintain film weldability/sealability and tensile strength.

In addition to the examples described above, the following examples are contemplated herein:

1. A multilayer polymeric film, comprising a first skin layer, a second skin layer, and an intermediate layer,
   wherein the first skin layer is formed of a first polymer composition, the second skin layer is formed of a second polymer composition, and the intermediate layer is formed of a third polymer composition;
   wherein each respective layer has distributed therein particles of titanium dioxide to a weight content of from 6 percent to 14 percent, more preferably from 8 percent to 12 percent, and even more preferably from 9 percent to 11 percent of the weight of the respective layer; and
   one or both the second skin layer and the intermediate layer has further distributed therein non-white pigment particles to a weight content of from 0.050 percent to 0.15 percent, respectively, of the weight of said second skin layer and/or intermediate layer.
2. The film of example 1 wherein one or both of the second skin layer and the intermediate layer has distributed therein non-white pigment particles to a weight content of said respective layer of equal to or greater than 0.060 percent, more preferably 0.070 percent, and even more preferably 0.080 percent; and equal to or less than 0.14 percent, more preferably 0.13 percent, and even more preferably 0.12 percent.
3. The film of either of examples 1 or 2 wherein the first skin layer no more than 0.050 percent by weight non-white pigment particles distributed therein.
4. The film of any of examples 1-3 wherein the intermediate layer has no more than 0.050 percent by weight non-white pigment particles distributed therein.
5. The film of any of examples 1-4 wherein the first skin, second skin, and intermediate layers have respective first, second and intermediate layer melt temperatures, wherein the second melt temperature is lower than the intermediate layer melt temperature.
6. The film of any of examples 1-5 wherein the first skin, second skin, and intermediate layers have respective first, second and intermediate layer melt temperatures, wherein the first melt temperature is lower than the intermediate layer melt temperature.
7. The film of any of examples 1-6 wherein the intermediate layer constitutes from 30 percent to 70 percent of the weight of the film.
8. The film of any of examples 1-7 wherein the third polymer composition comprises predominately HPDE, MDPE or LDPE, more preferably MDPE.
9. The film of any of the preceding examples wherein the second skin layer constitutes from 15 percent to 35 percent of the weight of the film.
10. The film of any of the preceding examples wherein the first skin layer constitutes from 15 percent to 35 percent of the weight of the film.
11. The film of any of the preceding examples wherein the first polymer composition comprises predominately MDPE, LDPE or LLDPE, more preferably LLDPE.
12. The film of any of the preceding examples wherein the second polymer composition comprises predominately MDPE, LDPE or LLDPE, more preferably LLDPE.
13. The film of any of the preceding examples wherein the non-white pigment particles are selected from the group consisting of inorganic pigments that impart blue and/or violet coloration, and combinations thereof.
14. The film of example 13 wherein the group consisting of inorganic pigments that impart blue coloration consists of cobalt blue, cerulean blue, Han blue, Egyptian blue, phthalo blue, Prussian blue, ultramarine, and combinations thereof; and the group consisting of inorganic pigments that impart violet coloration consists of ultramarine violet, Han purple, cobalt violet and manganese violet, and combinations thereof.
15. The film of any of the preceding examples produced by a cast co-extrusion process or a blown co-extrusion process.
16. The film of any of the preceding examples wherein no substantial quantity of adhesive is present between the layers.
17. The film of any of the preceding examples having a machine direction and a cross direction, and having a machine direction tensile strength to failure and a cross direction tensile strength to failure, wherein the cross direction tensile strength to failure is at least 75 percent of the machine direction tensile strength to failure.

18. The film of any of the preceding examples comprising one or more tie layers.

19. The film of any of the preceding examples having a caliper of from 40 μm to 100 μm, more preferably from 50 μm to 90 μm, and even more preferably from 60 μm to 80 μm.

20. The film of example 19 having an opacity equal to or greater than 80 percent, more preferably equal to or greater than 85 percent, even more preferably equal to or greater than 88 percent, and still more preferably equal to or greater than 90 percent.

21. The film of example 20 having an opacity less than 93 percent.

22. The film of any of the preceding examples bearing ink-printed multi-color graphic designs on an outer surface of the first skin layer.

23. A package enclosing a supply of non-fragile, compressible articles, the package comprising the film of any of the preceding examples.

24. The package of example 23 comprising seams at which separate portions of the film are fused together.

Opacity Measurement Method

Opacity values are measured using the method set forth in ISO 6504-3 (2006).

Since a sample of polymeric film, rather than a film of applied paint or varnish, is to be measured for opacity, it is unnecessary to prepare a sample including a film of applied paint or varnish as specified in the test procedure. Rather, it is only necessary to obtain samples of the film to be tested and overlay them onto black and white color standards tiles for measurement.

The tiles used are Ceram Colour Standards Series II (CCSSII) 10 cm×10 cm black and white sleek (gloss) surface color standards ceramic tiles available from Lucideon Limited, Stoke-on-Trent, Staffordshire, UK, and/or Lucideon M+P, Schenectady, N.Y.

The spectrophotometer used to make the required measurements is a SPECTRO-GUIDE 45/0 6801, from BYK-Gardner GmbH, Gerestried, Germany.

The dimensions and values disclosed herein are not to be understood as being strictly limited to the exact numerical values recited. Instead, unless otherwise specified, each such dimension is intended to mean both the recited value and a functionally equivalent range surrounding that value.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multilayer polymeric film comprising a first skin layer, a second skin layer, and an intermediate layer;
   wherein the first skin layer is formed of a first polymer composition, the second skin layer is formed of a second polymer composition, and the intermediate layer is formed of a third polymer composition;
   wherein the first skin layer comprises printed indicia disposed on an outer surface;
   wherein each of the first skin layer, the second skin layer, and the intermediate layer comprises from 6 percent to 14 percent by weight of each layer of titanium dioxide;
   wherein one or both of the second skin layer and the intermediate layer comprises from 0.050 percent to 0.15 percent by weight of the layer of non-white pigment; and
   wherein the first skin layer is substantially free of non-white pigment.

2. The film of claim 1 wherein one or both of the second skin layer and the intermediate layer comprises from 0.070 percent to 0.13 percent by weight of the layer of non-white pigment.

3. The film of claim 1 wherein the intermediate layer is substantially free of non-white pigment.

4. The film of claim 1 wherein the first skin layer, second skin layer, and intermediate layer have respective first skin layer, second skin layer, and intermediate layer melting temperatures, and wherein the second skin layer melting temperature is lower than the intermediate layer melting temperature.

5. The film of claim 1 wherein the intermediate layer constitutes from 30 percent to 70 percent of the weight of the film.

6. The film of claim 1 wherein the third polymer composition comprises HDPE, MDPE and/or LDPE.

7. The film of claim 1 wherein each of the first skin layer and the second skin layer constitutes from 15 percent to 35 percent of the weight of the film.

8. The film of claim 1 wherein the first polymer composition comprises MDPE, LDPE and/or LLDPE.

9. The film of claim 1 wherein the second polymer composition comprises MDPE, LDPE and/or LLDPE.

10. The film of claim 1 wherein the non-white pigment is an inorganic pigment selected from the group consisting of cobalt blue, cerulean blue, Han blue, Egyptian blue, phthalo blue, Prussian blue, ultramarine, ultramarine violet, Han purple, cobalt violet and manganese violet, and combinations thereof.

11. The film of claim 1 produced by a cast co-extrusion process or a blown co-extrusion process.

12. The film of claim 1 wherein no substantial quantity of adhesive is present between any of the layers.

13. The film of claim 1 comprising a machine direction and a cross direction, and having a machine direction tensile strength to failure and a cross direction tensile strength to failure, wherein the cross direction tensile strength to failure is at least 75 percent of the machine direction tensile strength to failure.

14. The film of claim 1 comprising one or more tie layers.

15. The film of claim 1 having a caliper of from 40 μm to 100 μm.

16. The film of claim 1 having an opacity equal to or greater than 85 percent.

17. The film of claim 16 having an opacity less than 93 percent.

18. The film of claim 1 wherein the printed indicia comprises multi-color ink graphic designs disposed on the outer surface of the first skin layer.

19. The film of claim 1 wherein the printed indicia comprises non-opaque printed indicia disposed on the outer surface of the first skin layer.

20. A package enclosing a supply of non-fragile, compressible articles, the package comprising the film of claim 1.

21. The package of claim 19 comprising seams at which separate portions of the film are fused together.

* * * * *